July 10, 1956  C. A. EDMAN  2,754,399
AUTOMATIC ELECTRIC COFFEE PERCOLATOR
Filed April 23, 1954

Inventor:
Carl A. Edman,
by Frank L. Neuhauser
His Attorney.

United States Patent Office 2,754,399
Patented July 10, 1956

2,754,399

AUTOMATIC ELECTRIC COFFEE PERCOLATOR

Carl A. Edman, Fairfield, Conn., assignor to General Electric Company, a corporation of New York Application April 23, 1954, Serial No. 425,186

4 Claims. (Cl. 219—20)

The present invention relates to automatic electric coffee makers of the percolator type wherein there are provided three heating units, a preheat or booster unit, a pump unit, and a keep-warm unit all controlled automatically by thermostat means, the preheat unit being arranged to impart heat to the main body of water in the percolator to bring or assist in bringing the water up to a temperature suitable for the brewing of the coffee; the pump unit being associated directly with the pump well for heating water in the well to form steam for forcing water from the well up through the fountain tube to the ground coffee containing basket; and the keep-warm unit being arranged for maintaining the brew at a suitable drinking temperature after the coffee has been made; the preheat unit being used also for reheating the coffee in case the percolator has been disconnected and the coffee has cooled.

In connection with percolators having thermostatically controlled heating units whereby the coffee brewing cycle is controlled automatically, it is desirable to have a signal or indicating means which shows when the cycle is completed and the object of the present invention is to provide an improved circuit arrangement which includes a signal or indicator for this purpose, the circuit arrangement being such that the signal is displayed only when the brewing cycle has been completed and the brew is at a suitable temperature for drinking; or in the case of reheating only when the temperature of the brew has again been brought up to the desired value.

Figure 1:
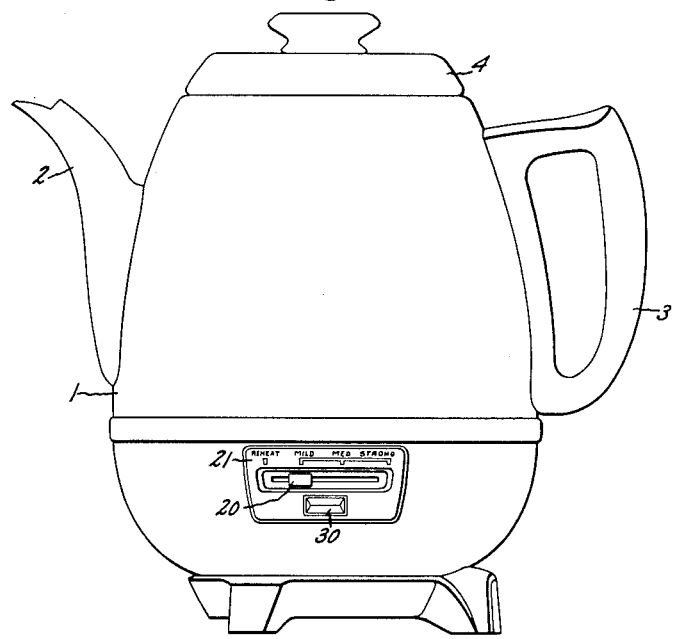
Figure 1 is a side elevation of a coffee percolator embodying the invention.

Referring to the drawings, 1 indicates a coffee percolator container to which is attached a pouring spout 2 and a handle 3, the open top of the container being closed by a cover 4. Insofar as my present invention is concerned the water well, the fountain tube, and the ground coffee holding basket may be of any suitable structure; and the electric heating units and the thermostat or thermostats may have any suitable arrangement with respect to the container and the water well. For example, the arrangement may be similar to that disclosed in the application of Albert W. Lohrman and Paul M. Kropp, Serial No. 425,160, filed of even date herewith and assigned to the same assignee as the instant application. My invention has to do only with the circuit arrangement whereby as pointed out above, a signal is provided which is displayed only when the coffee brewing cycle is completed and the brew is at a suitable drinking temperature, or, upon reheating, then when the brew is at a suitable drinking temperature.

Figure 2:
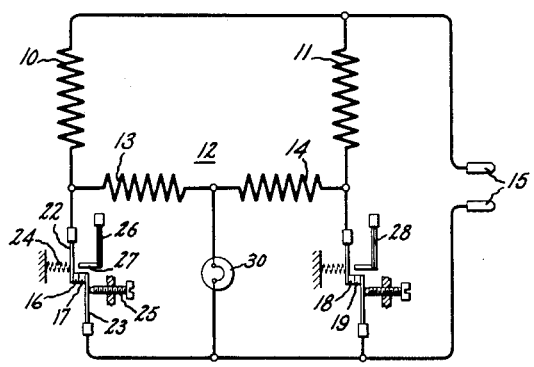
Figure 2 is a wiring diagram of the circuit arrangement.

In Figure 2 of the drawing, 10 indicates a pump unit which in the coffee maker is positioned to heat the pump well, and 11 and 12 indicate preheat and keep-warm units respectively which in the coffee maker are positioned to heat the main body of water in container 1, the keep-warm unit comprising two heating elements 13 and 14. At 15 are power terminals which may be connected by a suitable cord set to a source of electric power, i. e., the usual 115 volt domestic circuit. Pump unit 10 is connected to power terminals 15 in series with a pair of thermostat actuated contacts 16 and 17 and preheat unit 11 is connected to power terminals 15 in series with a pair of thermostat actuated contacts 18 and 19, the two circuits being in parallel with each other.

Thermostat means positioned in the percolator to be responsive to the temperature of the liquid in container 1 is provided for actuating the pairs of contacts 16, 17, 18 and 19, the arrangement being such, preferably, that the contacts and thermostat means may be adjusted relatively to each other to adjust the temperatures at which the respective pairs of contacts will be opened to thereby vary the strength of the brew. Such adjusting means is shown diagrammatically in Figure 2; and in Figure 1, 20 indicates a lever which may be arranged to effect the adjustment, the lever being movable with respect to a scale plate 21, having suitable indicia thereon indicating "Reheat," "Mild," "Medium" and "Strong." Contacts 16 and 17 are carried by spring strips 22 and 23 and are biased into engagement with each other by a spring 24 which presses against spring strip 22. Spring strip 23 is biased by its inherent resiliency against an adjustable stop 25. At 26 is a thermostat member which with increase in temperature flexes toward the left to bring a projection 27 on the thermostat into engagement with spring strip 22 to separate contacts 16 and 17. Stop 25 can be adjusted to adjust the position of spring strip 22 with respect to thermostat projection 27 to thereby adjust the temperature at which the thermostat separates the contacts. A similar structural arrangement for contacts 18 and 19 is illustrated, the thermostat member being indicated at 28. While two separate thermostat members 26 and 28 have been indicated, obviously a single thermostat member could be used, it being arranged to actuate both sets of contacts.

At 30 is indicated a signal member, here shown as an electric lamp. It is connected to the power terminals in series with keep-warm heating element 13 and pump unit 10 and also in series with keep-warm heating element 14 and preheat heating unit 11.

The keep-warm heating elements 13 and 14 are low-wattage, high-resistance elements as compared to pump heating unit 10 and preheat heating unit 11. For example, each heating element 13, 14 may have a wattage of the order of 30 watts and a resistance of the order of 330 ohms, and each heating element 10, 11 may have a wattage of the order of 400 watts and a resistance of the order of 33 ohms.

When coffee is to be brewed in the percolator, the needed amount of water is placed in container 1, the needed amount of ground coffee is placed in the coffee basket, and power terminals 15 are connected to a power circuit. Also, contacts 16, 17 and contacts 18, 19 are adjusted so that the thermostat means will open them at the desired temperatures. The settings may be such that contacts 18, 19 will be separated at one temperature and contacts 16, 17 at a higher temperature. When terminals 15 are connected to the power circuit, a circuit is closed through pump heating unit 10 and preheat heating unit 11 in parallel. Keep-warm heating elements 13 and 14 and signal lamp 30 are shunted by contacts 16, 17 and contacts 18, 19 so that significant current does not flow through lamp 30. When the predetermined temperature at which contacts 18, 19 are set to be opened is reached these contacts will be separated. However, lamp 30 and keep-warm heating unit 13 will still be shunted by contacts 16, 17 so that still there will be not sufficient current flow through lamp 30 to light it.

However, when the temperature increases to a value such that contacts 16, 17 are opened to terminate the coffee brewing cycle, then lamp 30 is connected to the power terminals by way of parallel circuits through keep-warm heating element 13 and pump heating unit 10 and keep-warm heating element 14 and preheat heating element 11; thus the lamp will be lighted and the keep-warm heating elements will function to keep the brew at the desired drinking temperature. Because of the high resistance of keep-warm heating elements 13 and 14 as compared to heating elements 10 and 11 most of the heat energy will be generated in elements 13 and 14.

When it is desired to reheat cold brew in the percolator, contacts 16, 17 are adjusted with respect to the thermostat means so that they are open or will be opened by the thermostat means at a relatively low temperature and contacts 18, 19 are adjusted so they will be opened by the thermostat means when a desired drinking temperature (a temperature higher than that for which contacts 16, 17 are set to be opened) is reached, and the power terminals connected to a line circuit. A circuit is thus closed through contacts 18, 19 and preheat unit 11 which is in shunt to lamp 30, keep-warm heating elements 13, 14 and pump heating unit 10 so that the lamp will not be lighted. When the temperature of the brew has been raised to the desired value, the thermostat means will separate contacts 18, 19 to make effective the circuit through lamp 30 and the keep-warm heating elements 13, 14 so that the lamp will indicate that the brew is at the desired drinking temperature and the heating elements will maintain it at such temperature, the arrangement being such that the heating elements will keep the brew at a temperature higher than that at which contacts 18, 19 were set to be opened.

Thus it will be seen that by my invention the signal lamp will, under either of the conditions of operation described, be lighted only when the brew is at the desired drinking temperature.

What I claim as new and desire to secure by Letters Patent of the United States is:

1. In an electric coffee maker, a pair of power terminals, a first heater circuit comprising a pump heating unit and thermostat actuated contacts connected in series to the power terminals, a second heater circuit comprising a preheat heating unit and thermostat actuated contacts connected to said power terminals in series with each other and in parallel to said first heater circuit, thermostat means for actuating said contacts, a keep-warm heating unit comprising two heating elements, a signal member, a circuit connecting the signal member to said power terminals in series with one of said keep-warm heating elements and said pump heating unit but in shunt to said first-named contacts, and a circuit connecting the signal member to said power terminals in series with the other of said keep-warm heating elements and said preheat heating unit but in shunt to said second-named contacts, whereby said signal member is actuated only when the thermostat actuated contacts in both heater circuits are open.

2. The combination defined by claim 1 wherein the signal member comprises a low voltage electric lamp.

3. The combination defined by claim 1, wherein the thermostat actuated contacts and the thermostat means are adjustable relatively to each other to adjust the temperatures at which the thermostat means actuates the contacts.

4. In an electric coffee maker, a pair of power terminals, a first heater circuit comprising a pump heating unit and thermostat actuated contacts connected in series to the power terminals, a second heater circuit comprising a preheat heating unit and thermostat actuated contacts connected to said power terminals in series with each other and in parallel to said first heater circuit, one end of each of said heating units being connected to one of said terminals, thermostat means for actuating said contacts, a keep-warm heating unit connected between the other end of said pump heating unit and the other end of said preheat heating unit, a signal member connected between an intermediate point on said keep-warm heating unit and the other of said terminals, whereby said signal member is actuated only when the thermostat actuated contacts in both heater circuits are open.

References Cited in the file of this patent

UNITED STATES PATENTS

| | | |
|---|---|---|
| 1,026,334 | Vessey | May 14, 1912 |
| 2,526,566 | Kolisch | Oct. 17, 1950 |
| 2,610,283 | Kolisch | Sept. 9, 1952 |
| 2,651,707 | Jepson | Sept. 8, 1953 |
| 2,658,134 | Kircher | Nov. 3, 1953 |